US011311952B2

(12) United States Patent
Wekwert et al.

(10) Patent No.: US 11,311,952 B2
(45) Date of Patent: Apr. 26, 2022

(54) RECIPROCATING SAW

(71) Applicant: MILWAUKEE ELECTRIC TOOL CORPORATION, Brookfield, WI (US)

(72) Inventors: James Wekwert, Wauwatosa, WI (US); Logan M. Hietpas, Shorewood, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 16/260,670

(22) Filed: Jan. 29, 2019

(65) Prior Publication Data

US 2019/0232402 A1    Aug. 1, 2019

Related U.S. Application Data

(60) Provisional application No. 62/624,209, filed on Jan. 31, 2018.

(51) Int. Cl.
| | | |
|---|---|---|
| *B23D 49/16* | (2006.01) | |
| *B23D 51/10* | (2006.01) | |
| *B23D 51/16* | (2006.01) | |
| *B23D 51/01* | (2006.01) | |
| *B23D 51/20* | (2006.01) | |

(52) U.S. Cl.
CPC .......... *B23D 49/165* (2013.01); *B23D 51/01* (2013.01); *B23D 51/10* (2013.01); *B23D 51/16* (2013.01); *B23D 51/20* (2013.01); *B23D 49/167* (2013.01); *Y10T 74/18256* (2015.01)

(58) Field of Classification Search
CPC .... B23D 51/16; B23D 49/162; B23D 49/165; Y10T 74/18256

USPC .................................................... 30/392–394
See application file for complete search history.

(56) References Cited

U.S. PATENT DOCUMENTS

| | | | |
|---|---|---|---|
| 2,337,769 | A | 12/1943 | Redenbo |
| 2,705,980 | A | 4/1955 | Papworth |
| 2,764,188 | A | 9/1956 | Hoffman |

(Continued)

FOREIGN PATENT DOCUMENTS

| | | |
|---|---|---|
| CN | 2693391 Y | 4/2005 |
| CN | 202555904 U | 11/2012 |

(Continued)

OTHER PUBLICATIONS

CN-104209886-A english translation; Dec. 2014; Xu Sibao B23D51/16.*

(Continued)

*Primary Examiner* — Laura M Lee
(74) *Attorney, Agent, or Firm* — Michael Best & Friedrich LLP

(57) ABSTRACT

A reciprocating saw includes a housing defining a motor housing portion, and a motor positioned in the motor housing portion, the motor having a motor output shaft defining a rotational axis, and a motor activation switch within the motor housing portion and adjacent the motor. The reciprocating saw also includes a transmission is positioned downstream of the motor and has a sawbar connectable to a saw blade. The transmission converts a rotational input provided by the motor shaft to a reciprocating output of the sawbar along a reciprocating axis that is either coaxial or parallel with the rotational axis.

20 Claims, 6 Drawing Sheets

(56) References Cited

U.S. PATENT DOCUMENTS

| | | |
|---|---|---|
| 3,303,563 A | 2/1967 | Peterson |
| 3,388,470 A | 6/1968 | Ufer |
| 3,978,862 A | 9/1976 | Morrison |
| 4,489,724 A | 12/1984 | Arnegger |
| 5,099,705 A | 3/1992 | Dravnieks |
| 5,201,749 A | 4/1993 | Sachse et al. |
| 5,658,193 A | 8/1997 | McCambridge |
| 6,357,125 B1 * | 3/2002 | Feldmann ............... B23D 51/16 30/277.4 |
| 6,393,701 B1 | 5/2002 | Fuchs et al. |
| 6,925,719 B2 | 8/2005 | Callne |
| 7,225,546 B2 | 6/2007 | Hartmann |
| 7,290,343 B2 | 11/2007 | Hartmann |
| 8,407,902 B2 * | 4/2013 | Naughton ............... B23D 49/11 30/392 |
| 9,073,563 B2 * | 7/2015 | Middleton ................ B26B 7/00 |
| 9,339,878 B2 | 5/2016 | Fuchs |
| 9,457,489 B2 | 10/2016 | Fuchs |
| 9,539,717 B2 | 1/2017 | Fuchs |
| 9,610,698 B2 | 4/2017 | Fuchs |
| 9,744,684 B2 | 8/2017 | Fuchs |
| 9,844,824 B2 | 12/2017 | Fuchs |
| 2006/0085990 A1 | 4/2006 | Ulmer et al. |
| 2007/0163127 A1 | 7/2007 | Discoe et al. |
| 2011/0239474 A1 * | 10/2011 | Hirabayashi ........... B23D 51/16 30/392 |
| 2012/0192438 A1 * | 8/2012 | Aoki ...................... B23D 51/16 30/392 |
| 2012/0192440 A1 | 8/2012 | Jerabek et al. |
| 2013/0133210 A1 | 5/2013 | Weir et al. |
| 2014/0041502 A1 | 2/2014 | Fuchs et al. |
| 2014/0047720 A1 | 2/2014 | Vitantonio et al. |
| 2014/0053417 A1 | 2/2014 | Fuchs |
| 2014/0173918 A1 | 6/2014 | Fuchs et al. |
| 2014/0190023 A1 | 7/2014 | Vitantonio et al. |
| 2014/0216777 A1 * | 8/2014 | Emch ...................... B25F 5/00 173/170 |
| 2014/0245620 A1 | 9/2014 | Fankhauser et al. |
| 2017/0361386 A1 | 12/2017 | Lu |

FOREIGN PATENT DOCUMENTS

| | | | |
|---|---|---|---|
| CN | 104209886 A | * 12/2014 | ............ B23D 51/16 |
| CN | 108702964 A | * 10/2018 | ............ A01G 3/085 |
| DE | 8408651 U1 | 6/1984 | |
| DE | 3828785 A1 | 4/1989 | |
| DE | 4235278 A1 | 4/1994 | |
| DE | 19938475 B4 | 8/2005 | |
| EP | 0868256 A2 | 5/1999 | |
| EP | 0916456 A2 | 5/1999 | |
| EP | 2532462 A1 | 12/2012 | |
| EP | 2681019 B1 | 8/2015 | |
| EP | 2680994 B1 | 5/2016 | |
| GB | 2234032 A | 1/1991 | |
| WO | 9722437 A1 | 6/1997 | |
| WO | 2005049267 A1 | 6/2005 | |
| WO | 2012116825 A1 | 9/2012 | |
| WO | 2012116831 A1 | 9/2012 | |
| WO | 2012116835 A1 | 9/2012 | |
| WO | 2012116837 A1 | 9/2012 | |

OTHER PUBLICATIONS

CN-108702964-A english translation; Oct. 2018 ; Ouyang Zhi; A01G3/085.*

Milwaukee Electric Tool, "M18 Fuel Sawzall Reciprocating Saw Service Parts List," 2017, 5 pages.

International Search Report and Written Opinion for Application No. PCT/US2019/015566 dated Apr. 29, 2019, 16 pages.

\* cited by examiner

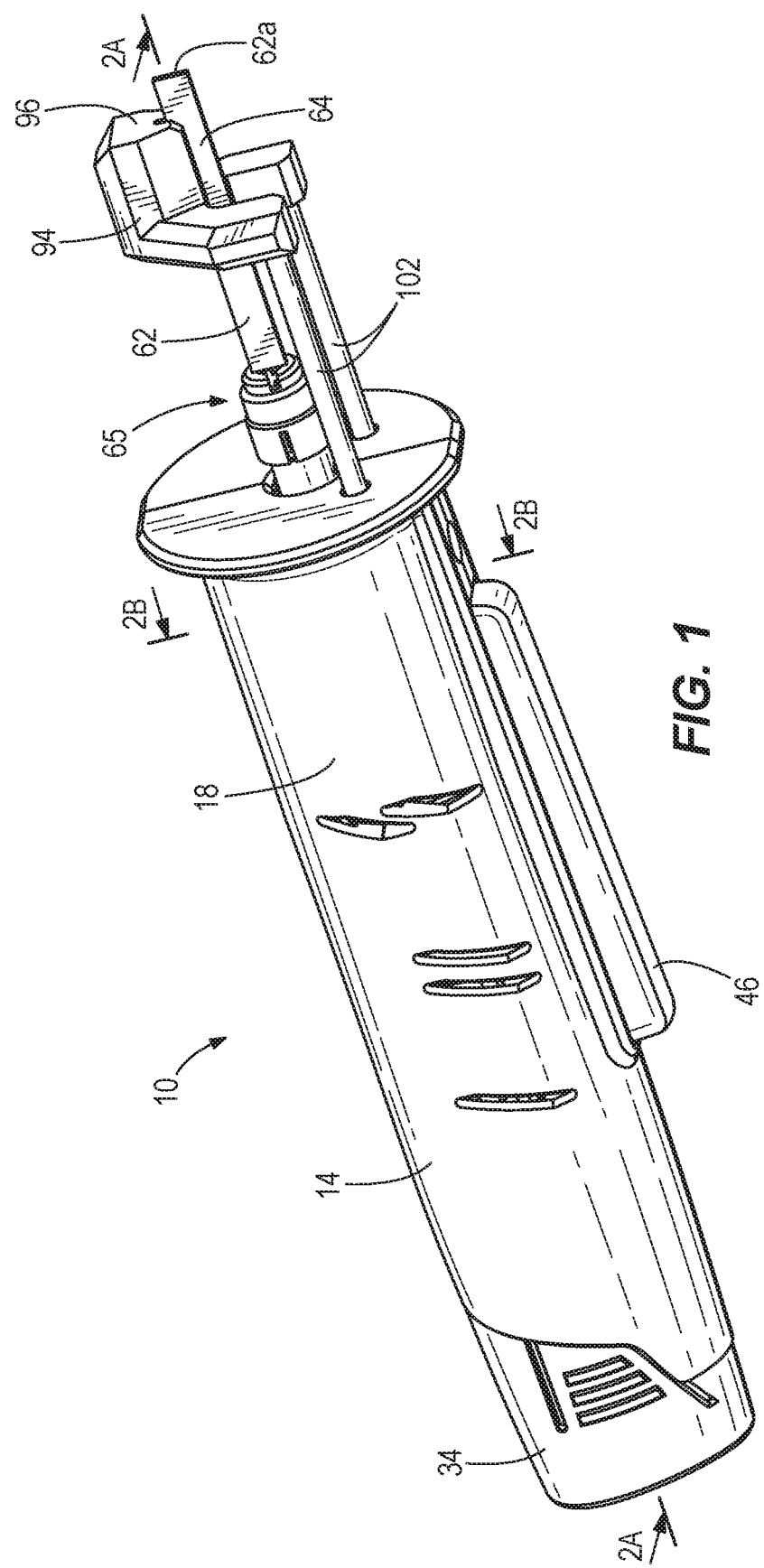

# RECIPROCATING SAW

CROSS-REFERENCE TO RELATED APPLICATIONS

This application claims priority to U.S. Provisional Patent Application No. 62/624,209 filed on Jan. 31, 2018, the entire contents of which is incorporated herein by reference.

FIELD OF THE INVENTION

The present invention relates to power tools, and more particularly to reciprocating saws.

BACKGROUND OF THE INVENTION

Reciprocating saws typically include an electric motor, a blade coupled to a scotch yoke mechanism, and a transmission for transferring torque from the motor to the scotch yoke mechanism, which converts the rotational input from the transmission to a reciprocating output of the blade. Such reciprocating saws are not typically utilized to provide precise cutting operations to a workpiece. However, this becomes challenging as the size and the weight of the saw increases.

SUMMARY OF THE INVENTION

The present invention provides, in one aspect, a reciprocating saw including a housing defining a motor housing portion, a motor positioned in the motor housing portion, the motor having a motor output shaft defining a rotational axis, and a motor activation switch within the motor housing portion and adjacent the motor. The reciprocating saw also includes a transmission positioned downstream of the motor and having a sawbar connectable to a saw blade. The transmission converts a rotational input provided by the motor shaft to a reciprocating output of the sawbar along a reciprocating axis that is either coaxial or parallel with the rotational axis.

The present invention provides, in another aspect, a reciprocating saw including a housing defining a motor housing portion, a motor positioned in the motor housing portion, the motor having a motor output shaft defining a rotational axis, and a transmission positioned downstream of the motor. The transmission includes a pinion driven by the motor output shaft, a ring gear meshed with the pinion and having a pin eccentrically coupled thereto, and a sawbar movable along a reciprocating axis that is either coaxial or parallel with the rotational axis. The sawbar has a slot in which the pin is received. The slot extends in a direction that is transverse to both the rotational axis of the motor output shaft and the reciprocating axis of the sawbar.

The present invention provides, in another aspect, a reciprocating saw including a housing defining a motor housing portion and a battery receptacle, a motor positioned in the motor housing portion, the motor having a motor output shaft defining a rotational axis, a transmission positioned downstream of the motor and having a sawbar connectable to a saw blade, the transmission converting a rotational input provided by the motor shaft to a reciprocating output of the sawbar along a reciprocating axis that is either coaxial or parallel with the rotational axis, a battery pack at least partially received within the battery receptacle, and a clamp assembly on the sawbar to which the saw blade is attachable. The reciprocating saw defines an overall length of about 12 inches or less between an end of the battery pack protruding from the battery receptacle and a distal end of the clamp assembly. The motor housing portion defines a maximum width of about 2.5 inches or less.

Other features and aspects of the invention will become apparent by consideration of the following detailed description and accompanying drawings.

BRIEF DESCRIPTION OF THE DRAWINGS

FIG. 1 is a perspective view of a reciprocating saw in accordance with an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 2A:
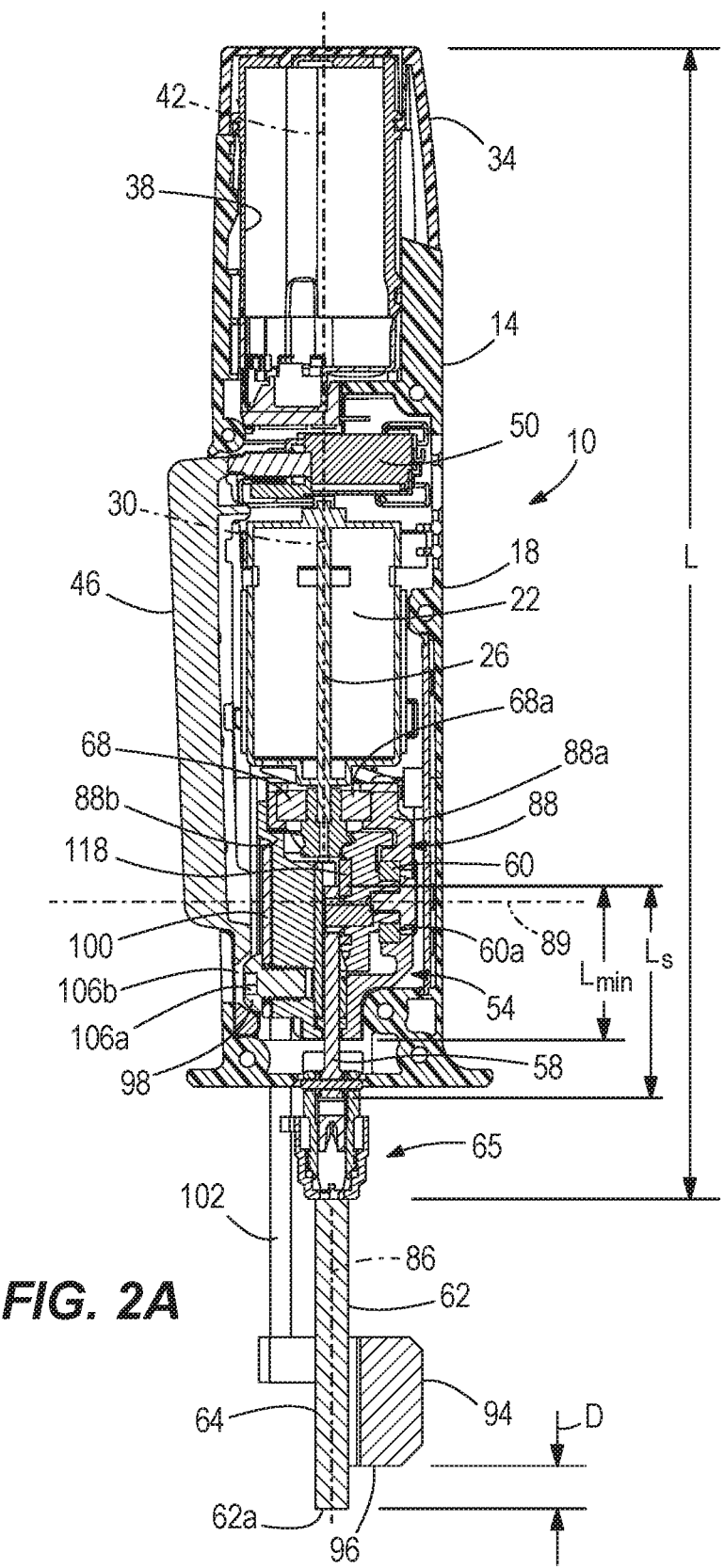
FIG. 2A is a longitudinal cross-sectional view of the reciprocating saw of FIG. 1.

FIGS. 1 and 2A illustrate a power tool, configured as a compact reciprocating saw 10, embodying the invention. The reciprocating saw 10 includes a housing 14, defining a motor housing portion 18, and an electric motor 22 (FIG. 2A) positioned in the motor housing portion 18. The motor 22 includes a motor output shaft 26 defining a rotational axis 30. The saw 10 also includes a battery pack 34 at least partially received in a battery receptacle 38 in the housing 14 along an insertion axis 42 that is parallel with the rotational axis 30. Alternatively, the insertion axis 42 may be parallel with the rotational axis 30. The saw 10 further includes a motor activation trigger 46 pivotably coupled to the housing 14 and graspable by a user of the reciprocating saw 10 between a first position, in which the motor 22 is deactivated, and a second position, in which is motor 22 is activated. The saw 10 also includes an electrical motor activation switch 50 within the motor housing portion 18 and adjacent the motor 22 that is actuated by the motor activation trigger 46 between a first state coinciding with the first position of the trigger 46, and a second state coinciding with the second position of the trigger. In some embodiments, the motor activation switch 50 is a variable speed trigger switch, such that depressing the trigger 46 to a predetermined position activates the motor 22 at a corresponding rotational speed.

Figure 2B:
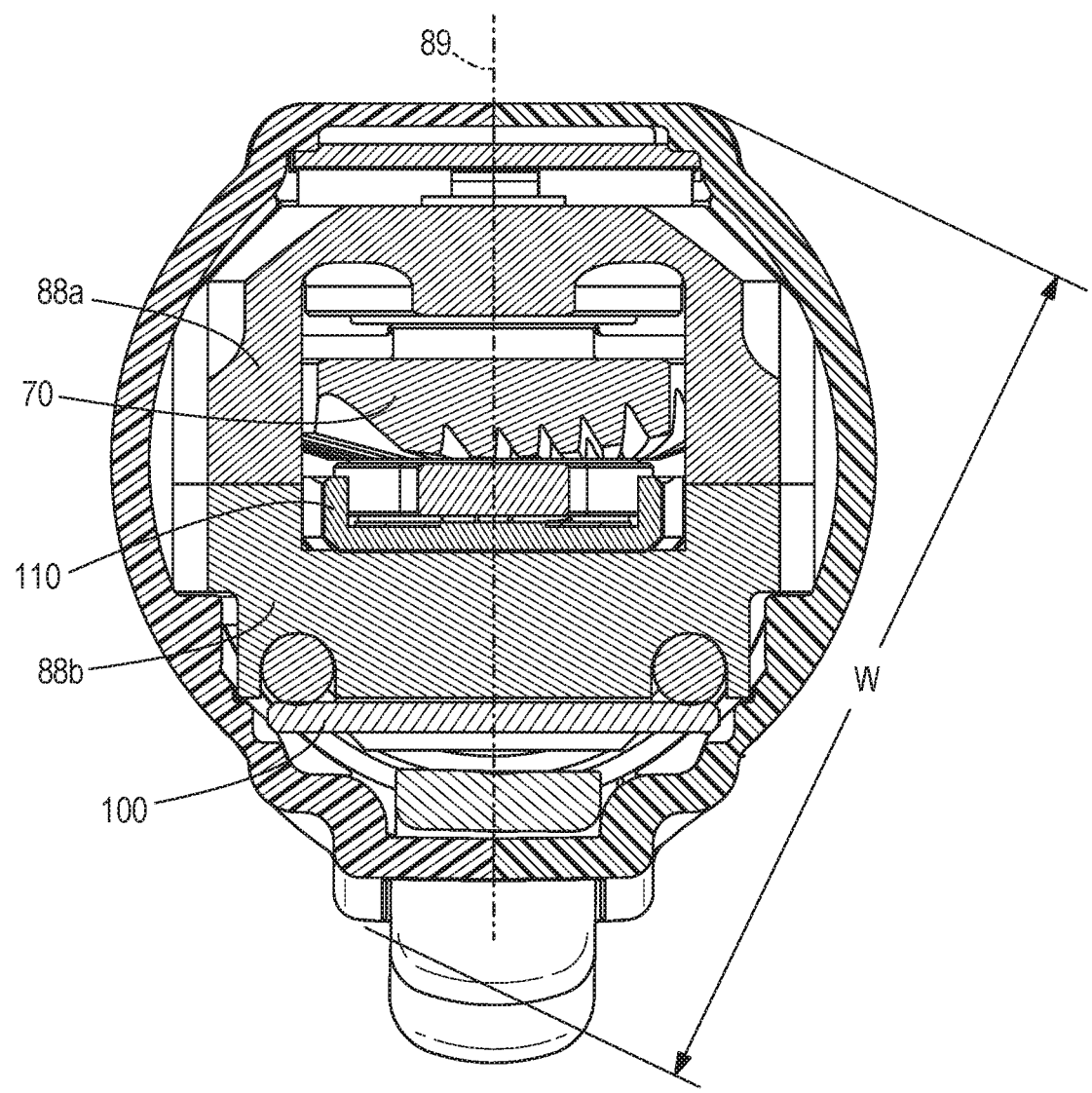
FIG. 2B is a lateral cross-sectional view of the reciprocating saw of FIG. 1.
Figure 3:
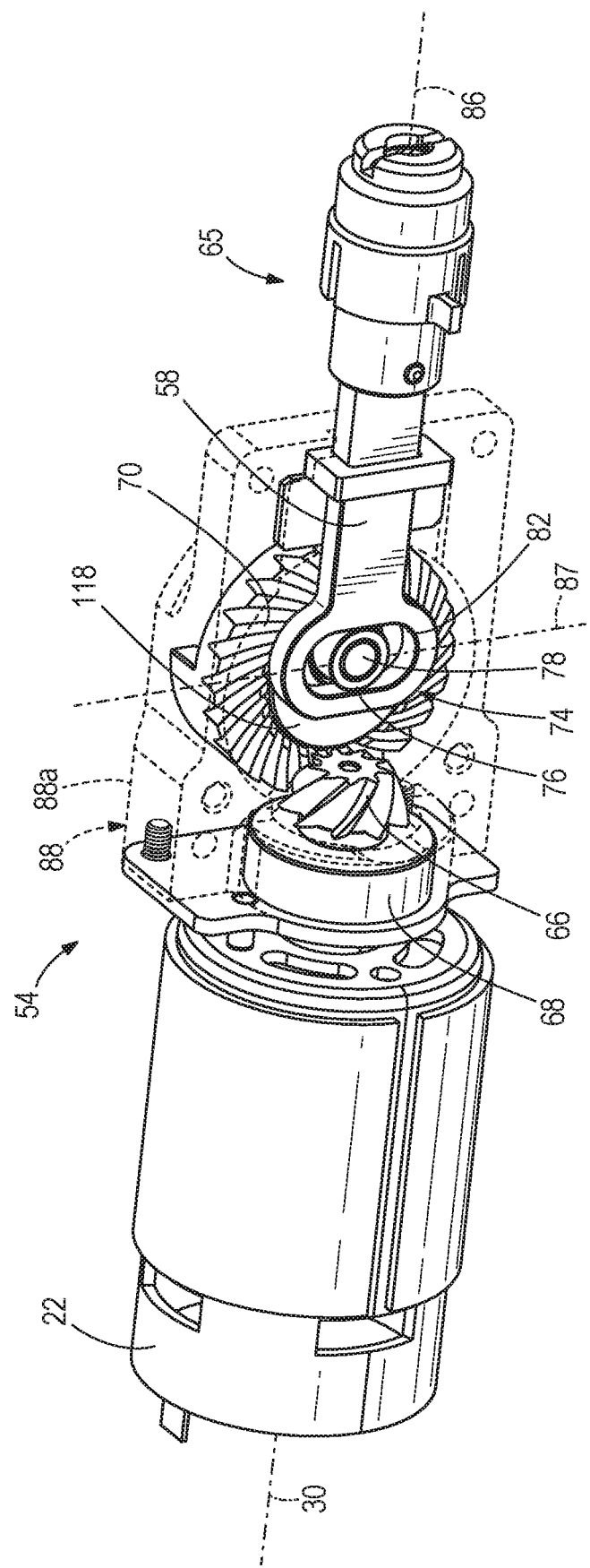
FIG. 3 is a perspective view of a transmission of the reciprocating saw of FIG. 1.

With reference to FIGS. 2A and 3, the saw 10 also includes a transmission 54 positioned downstream of the motor 22 in the motor housing portion 18. The transmission 54 includes a yoke or spindle, which hereinafter will be referred to as a sawbar 58, connectable to a saw blade 62 (FIG. 2) having a serrated edge 64 in contact with a workpiece. In the illustrated embodiment, the saw 10 includes a clamp assembly (e.g., collet assembly 65) on the sawbar 58 to quickly attach and release the saw blade 62 to the sawbar 58. As shown in FIG. 3, the transmission 54 also includes a pinion 66 driven by the motor output shaft 26, a ring gear 70 meshed with the pinion 66, and a scotch yoke mechanism 74 driven by the ring gear 70. The scotch yoke mechanism 74 includes a bushing 76 and a pin 78 eccentrically coupled to the ring gear 70 for co-rotation therewith, and the sawbar 58, which includes a laterally extending slot 82 in which the bushing 76 and pin 78 are received. The transmission 54 converts a rotational input provided by the motor output shaft 26 to a reciprocating output of the sawbar 58 along a reciprocating axis 86 (FIG. 2A) that is parallel with the rotational axis 30 of the motor output shaft 26. As shown in FIG. 3, the slot 82 extends in a direction (along axis 87) that is transverse to both the rotational axis 30 of the motor output shaft 26 and the reciprocating axis 86 of the sawbar 58. In some embodiments of the saw 10, the stroke of the reciprocating sawbar 58 is less than 0.5 inches. In the illustrated embodiment of the saw 10, the stroke of the reciprocating sawbar 58 is approximately 0.25 inches. In alternative embodiments, the transmission 54 may include alternative reciprocating mechanisms in place of the scotch yoke mechanism 74, such as a wobble plate mechanism or a barrel cam mechanism.

With reference to FIG. 2A, the transmission 54 further includes a transmission housing 88 in which the ring gear 70 is supported for rotation and the sawbar 58 is supported for reciprocation. In the illustrated embodiment, the transmission housing 88 includes a base plate 88a on which the ring gear 70 is rotatably supported and a cover 88b secured to the base plate 88a. The base plate 88a includes a first bearing receptacle 60a in which a corresponding bearing 60 is received to rotatably support the ring gear 70 about a rotational axis 89 that is transverse to the rotational axis 30 of the motor output shaft 26. The base plate 88a also includes a second bearing receptacle 68a in which a corresponding bearing 68 is received to rotatably support the pinion 66 about the rotational axis 30.

Figure 4:
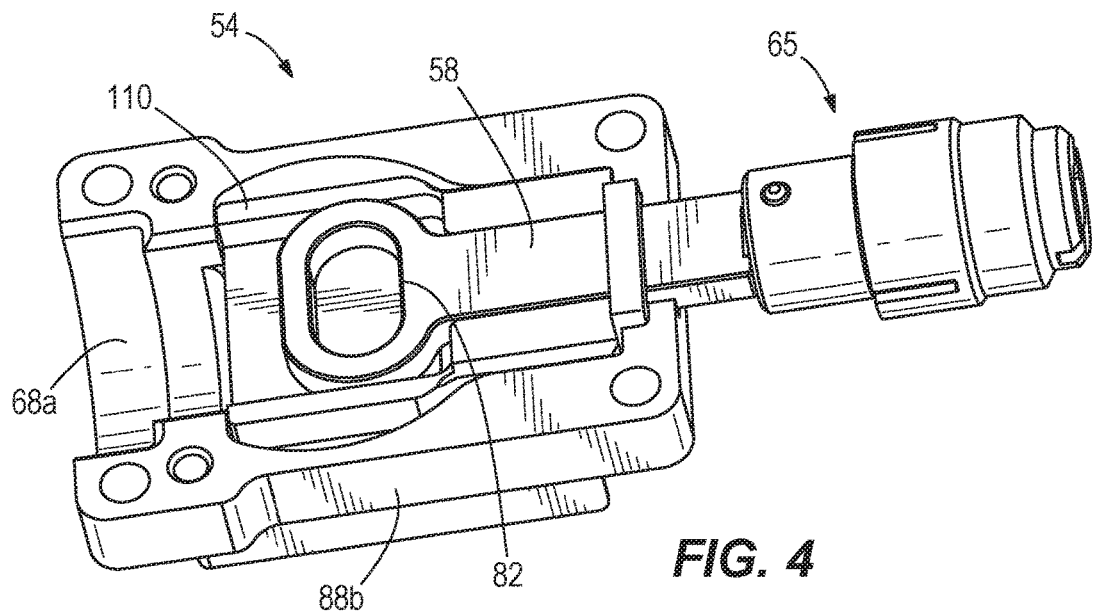
FIG. 4 is a perspective view of a scotch yoke mechanism of the reciprocating saw of FIG. 1.

With reference to FIG. 4, the transmission 54 further includes a bearing plate 110 located between the cover 88b and the base plate 88a that supports the saw bar 58 both in a lateral direction and a vertical direction, thus restricting movement of the saw bar 58 to translational movement. As shown in FIGS. 2A and 3, in addition to sliding along the bearing plate 110, the sawbar 58 also slides along a bearing insert 118 attached to the face of the ring gear 70 during reciprocation of the sawbar 58. Therefore, a combination of the bearing plate 110 and the bearing insert 118 provide lateral stability to the sawbar 58 as it reciprocates.

Figure 6:
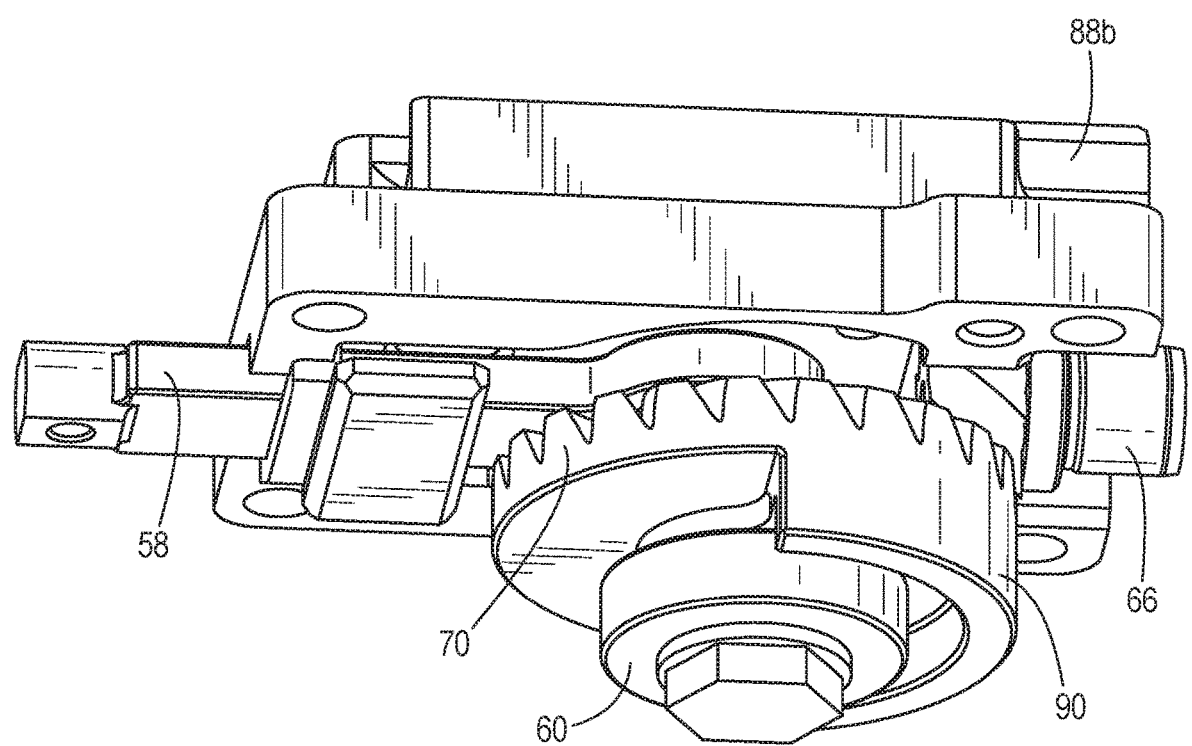
FIG. 6 is an additional perspective view of a transmission of the reciprocating saw of FIG. 1.

With reference to FIG. 6, the ring gear 70 includes a circumferential counterweight 90 on one half thereof that moves out of phase with the sawbar 58 during operation of the saw 10 to attenuate vibration caused by the reciprocating sawbar 58 and the other reciprocating components attached to the sawbar 58. The counterweight 90 is annular, and the ring gear bearing 60 is partly recessed within the counterweight 90, thus reducing the height of the ring gear 70, and therefore the maximum width W (FIG. 2B) of the saw 10, where the maximum width W is measured along a dimension that is transverse to the axes 30, 86.

Figure 5:
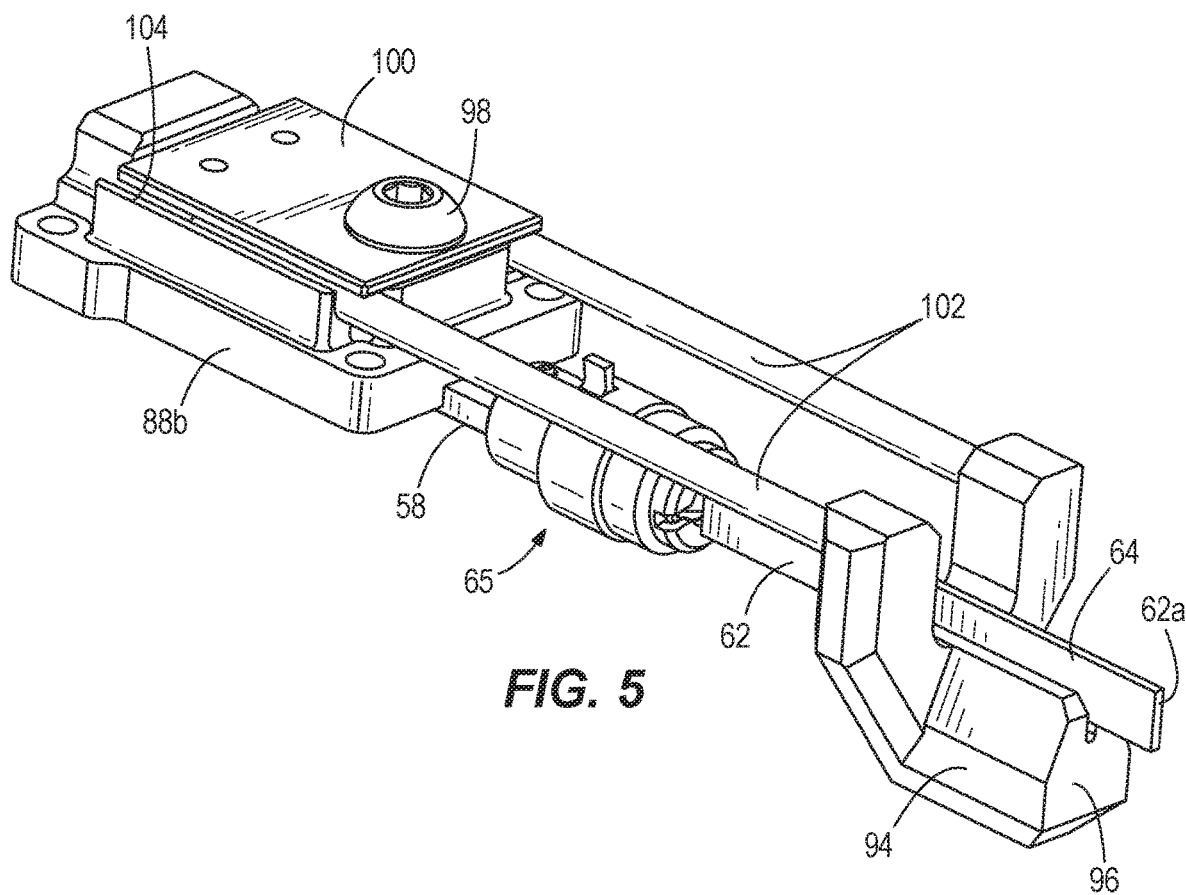
FIG. 5 is a perspective view of a portion of the reciprocating saw of FIG. 1.

With reference to FIGS. 2A and 5, the saw 10 also includes a shoe 94 extending from the housing 14 against which the saw blade 62 is supportable. The shoe 94 is adjustable relative to the housing 14 to vary the distance D (FIG. 2A) that a distal end 62a of the saw blade 62 protrudes from a distal end 96 of the shoe 94, to thereby vary the cutting depth of the saw blade 62. The optimal cutting depth D of the saw blade is about 0.375 inches to about 1.5 inches. However, in other embodiments of the saw 10, the cutting depth D may be greater than 1.5 inches. The distal end 96 of the shoe 94 also provides a guide surface along which the workpiece being cut by the saw 10 is slidable during a cutting operation.

To adjust the shoe 94, a fastener 98 (see also FIG. 5) is loosened to release a clamping force exerted on parallel posts 102 connecting the shoe 94 to the housing 14, thereby permitting the posts 102 to slide relative to the housing 14 and adjust the shoe 94 accordingly. To lock the shoe 94 in a new position, the fastener 98 is tightened, thereby reapplying the clamping force to the posts 102. Specifically, the fastener 98 secures a locking plate 100 to the cover 88b, which includes longitudinal grooves 104 (FIG. 5) in which the respective posts 102 are slidable. By tightening the fastener 98, a clamping force is applied to the locking plate 100, which in turn clamps the posts 102 against the cover 88b. In some embodiments (not shown), the fastener 98 may be tightened without the use of tools, for example, through the use of a lever clamp and over-center cam. As shown in FIG. 2A, both the trigger 46 and the housing 14 include respective apertures 106a, 106b that are coaxial with the fastener 98, permitting a hand tool (e.g., a hexagonal wrench) to be inserted through the aligned apertures 106a, 106b and engaged with the fastener 98 for tightening and loosening the fastener 98 as described above.

Once the cutting depth distance D is set by the user of the saw 10 as described above, the saw 10 is ready for use. The user grips the motor housing portion 18 with the palm of their hand and wraps one or more fingers over the trigger 46. With the blade 62 positioned adjacent an edge of a workpiece, the user rests the distal end 96 of the shoe 94 against the workpiece and depresses the trigger 46, thereby activating the motor 22 to reciprocate the blade 62. Alternatively, the user may first activate the motor 22 by depressing the trigger 46, and then plunge the blade 62 into the workpiece without a pilot hole. As the saw 10 is pushed along a cut direction, a reaction force is applied to the blade 62 in an opposite direction. However, the shoe 94 supports the saw blade 62 and prevents it from deflecting, thereby maintaining a straight cutting edge, and permitting the blade 62 to be plunged into a workpiece without first creating a pilot hole. Alternatively, the saw blade 62 may be supported by a separate bracket other than the shoe 94.

As shown in FIG. 2A, the reciprocating saw 10 defines an overall length L between an end of the battery pack 34 and a distal end of the collet assembly 65 of about 12 inches or less. In some embodiments, the overall length L is between about 10.5 inches and about 10.75 inches. As shown in FIG. 2B, the reciprocating saw 10 also defines a maximum width W of about 2.5 inches or less. In some embodiments, the maximum width of the reciprocating saw 10 is about 2.25 inches. The sawbar 58 defines a length Ls of about 1.94 inches (FIG. 2A), a minimum length Lmin of about 1.40 inches of which is supported on either side of the sawbar 58 by the cover 88b and the base plate 88a (and in particular the bearing plate 110 and the bearing insert 118) when the sawbar 58 is reciprocated to its forwardmost position shown in FIG. 2A. Therefore, a minimum of 72.2% of the length Ls of the sawbar 58 is supported during operation, which amounts to between about 13.0% and about 13.3% of the overall length L. Furthermore, the ratio of the length Ls of the sawbar 58 to the overall length L is about 0.16:1 or higher, and in the illustrated embodiment, between about 0.18:1 and about 0.2:1.

The compact size of the reciprocating saw 10 allows for a more accurate and higher controlled cut. Furthermore, the compact size allows for an increased level of cut precision, residual debris management, and portability.

Various feature of the invention are set forth in the following claims.

What is claimed is:

1. A reciprocating saw comprising:
   a housing defining a motor housing portion;
   a motor positioned in the motor housing portion, the motor having a motor output shaft defining a rotational axis;
   a motor activation switch within the motor housing portion and adjacent the motor;
   a transmission positioned downstream of the motor and having a sawbar connectable to a saw blade, the transmission converting a rotational input provided by the motor shaft to a reciprocating output of the sawbar along a reciprocating axis that is either coaxial or parallel with the rotational axis, wherein the transmission also includes a rotatable counterweight configured to move out of phase with reciprocation of the sawbar during operation to attenuate vibration, and wherein the reciprocating axis is located between the rotational axis and the rotatable counterweight; and
   a ring gear including a pin eccentrically coupled thereto; and
   a bearing rotatably supporting the rotatable counterweight and the ring gear, wherein the bearing and the counterweight are bisected by a common plane that is parallel to the reciprocating axis.

2. The reciprocating saw of claim 1, wherein the reciprocating axis is parallel with the rotational axis of the motor output shaft.

3. The reciprocating saw of claim 1, further comprising:
   a battery pack at least partially received within a battery receptacle in the housing; and
   a clamp assembly on the sawbar to which the saw blade is attachable, wherein the reciprocating saw defines an overall length between an end of the battery pack protruding from the battery receptacle and a distal end of the clamp assembly, and wherein the overall length is about 12 inches or less.

4. The reciprocating saw of claim 3, wherein the battery pack is either coaxial or parallel with the rotational axis of the motor.

5. The reciprocating saw of claim 3, wherein the overall length is between about 10.5 inches and about 10.75 inches.

6. The reciprocating saw of claim 5, wherein a ratio of a length of the sawbar to the overall length between the end of the battery pack protruding from the battery receptacle and the distal end of the clamp assembly is between about 0.18:1 and about 0.2:1.

7. The reciprocating saw of claim 3, wherein the motor housing portion defines a maximum width of about 2.5 inches or less.

8. The reciprocating saw of claim 7, wherein the maximum width of the motor housing portion is about 2.25 inches.

9. The reciprocating saw of claim 1, further comprising a shoe extending from the housing against which the saw blade is supportable.

10. The reciprocating saw of claim 9, wherein the position of the shoe relative to the housing is adjustable.

11. The reciprocating saw of claim 10, wherein a cutting depth measured between a distal end of the saw blade and a distal end of the shoe is about 0.375 inches to about 1.5 inches.

12. The reciprocating saw of claim 1, further comprising a motor activation trigger protruding from the motor housing portion, wherein the motor housing portion is graspable by a user of the reciprocating saw to actuate the motor activation trigger between a first position, in which the motor is deactivated, and a second position, in which the motor is activated.

13. The reciprocating saw of claim 1, wherein the transmission includes a scotch yoke mechanism, of which the sawbar is a component, for providing the reciprocating output to the sawbar, and wherein a stroke of the sawbar is less than 0.5 inches.

14. The reciprocating saw of claim 13, wherein the stroke of the sawbar is about 0.25 inches.

15. The reciprocating saw of claim 1, wherein the maximum operating speed of the reciprocating saw is greater than 3000 strokes per minute.

16. The reciprocating saw of claim 15, wherein the maximum operating speed of the reciprocating saw is about 3000 strokes per minute to about 6500 strokes per minute.

17. A reciprocating saw comprising:
   a housing defining a motor housing portion;
   a motor positioned in the motor housing portion, the motor having a motor output shaft defining a rotational axis; and
   a transmission positioned downstream of the motor, the transmission including
      a pinion driven by the motor output shaft,
      a ring gear meshed with the pinion and having a pin eccentrically coupled thereto, and a rotatable counterweight,
      a sawbar movable along a reciprocating axis that is either coaxial or parallel with the rotational axis, the sawbar having a slot in which the pin is received, the slot extending in a direction that is transverse to both the rotational axis of the motor output shaft and the reciprocating axis of the sawbar, wherein the rotatable counterweight is configured to move out of phase with reciprocation of the sawbar during operation to attenuate vibration, and wherein the reciprocating axis is located between the rotational axis and the rotatable counterweight, and
      a bearing rotatably supporting the rotatable counterweight and the ring gear, wherein the bearing and the counterweight are bisected by a common plane that is parallel to the reciprocating axis.

18. The reciprocating saw of claim 17, wherein the transmission converts a rotational input provided by the motor output shaft to a reciprocating output of the sawbar along the reciprocating axis.

19. The reciprocating saw of claim 17, further comprising a battery pack at least partially received within a battery receptacle in the housing, wherein the battery pack is either coaxial or parallel with the rotational axis of the motor.

20. The reciprocating saw of claim 17, further comprising a motor activation trigger protruding from the motor housing portion, wherein the motor housing portion is graspable by a user of the reciprocating saw to actuate the motor activation trigger between a first position, in which the motor is deactivated, and a second position, in which the motor is activated.

* * * * *